(12) United States Patent
Venkata et al.

(10) Patent No.: US 7,305,058 B1
(45) Date of Patent: Dec. 4, 2007

(54) MULTI-STANDARD CLOCK RATE MATCHING CIRCUITRY

(75) Inventors: Ramanand Venkata, San Jose, CA (US); Chong H Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 770 days.

(21) Appl. No.: 10/317,264

(22) Filed: Dec. 10, 2002

(51) Int. Cl.
*H04L 7/00* (2006.01)

(52) U.S. Cl. .................... 375/372; 327/144; 365/240; 710/52; 713/400

(58) Field of Classification Search ............... 327/144; 365/240; 703/21; 709/225; 710/52, 58; 713/400; 711/167; 326/39
See application file for complete search history.

(56) References Cited

U.S. PATENT DOCUMENTS

| | | | | |
|---|---|---|---|---|
| 5,757,207 A | * | 5/1998 | Lytle et al. | 326/39 |
| 5,838,950 A | * | 11/1998 | Young et al. | 703/21 |
| 6,487,648 B1 | * | 11/2002 | Hassoun | 711/167 |
| 2002/0129196 A1 | * | 9/2002 | Volk et al. | 711/105 |

OTHER PUBLICATIONS

U.S. Appl. No. 09/805,843, filed Mar. 13, 2001, Aung et al.
U.S. Appl. No. 10/093,785, filed Mar. 6, 2002, Lee et al.
U.S. Appl. No. 10/195,229, filed Jul. 11, 2002, Venkata et al.
U.S. Appl. No. 10/273,899, filed Oct. 16, 2002, Venkata et al.
U.S. Appl. No. 10/317,262, filed Dec. 10, 2002, Venkata et al.

* cited by examiner

*Primary Examiner*—David C. Payne
*Assistant Examiner*—Adolf DSouza
(74) *Attorney, Agent, or Firm*—Ropes & Gray LLP

(57) ABSTRACT

Clock rate matching circuitry is provided to buffer data between two clock domains that may have slightly different frequencies. To facilitate supporting a wide range of different communication protocols, the clock rate matching circuitry includes dedicated control circuitry and is also associated with other circuitry that is capable of acting as control circuitry that can be used as an alternative to at least part of the dedicated control circuitry. For example, the dedicated control circuitry may be set up to support one or several industry-standard protocols. The other circuitry (which may be, for example, programmable logic circuitry) is available to support any of a wide range of other protocols, whether industry-standard or custom.

18 Claims, 2 Drawing Sheets

MULTI-STANDARD CLOCK RATE MATCHING CIRCUITRY

BACKGROUND OF THE INVENTION

This invention relates to data communication, and more particularly to circuitry for receiving data signals that have been communicated from a data signal source.

Data signals may be transmitted from source (or transmitter or TX) circuitry (employing a source circuitry clock) to destination (or receiver or RX) circuitry (employing a destination circuitry clock). Although nominally of the same frequency, there may be a slight difference in actual frequency between the source circuitry clock and the destination circuitry clock. The destination circuitry receives data at the source clock rate, but ultimately processes that data at the destination clock rate. If the source clock is slightly faster than the destination clock, the destination circuitry will ultimately not be able to keep up with the incoming data unless some provision is made for dealing with that type of situation. Similarly, if the source clock is slightly slower than the destination clock, the destination circuitry will occasionally run out of data to process and may therefore operate erroneously, again unless some provision is made to deal with that type of situation.

To address issues of this kind it is known to include "clock rate matching" circuitry in receiver (destination) circuitry. Clock rate matching circuitry is typically buffer circuitry such as a first-in/first-out ("FIFO") memory. The FIFO stores received data at the TX (source circuitry) clock rate. The oldest, previously unread data in the FIFO is read out at the RX (destination circuitry) clock rate. If the FIFO is becoming too full, it is because the TX clock is faster than the RX clock. This is dealt with by deleting (e.g., not writing into the FIFO) a deletable item of data, such deletable (and therefore ultimately meaningless) items of data being occasionally included in the data stream for this purpose. (An "item" of data is typically the amount of data that would otherwise be written into the FIFO in one cycle of the FIFO write clock. For example, such an item of data may be a "byte" of eight or some other predetermined plural number of bits, or a "word" of two or some other predetermined plural number of bytes, or any other predetermined amount of data. For convenience herein such items of data will generally be assumed to be individual bytes, but it will be understood that this is only illustrative and that any other amount of data can be a deleted item (or an inserted item).)

Similarly, if the FIFO is becoming too empty, it is because the TX clock is slower than the RX clock. This is dealt with by inserting (e.g., reading again from the FIFO) an insertable item of data. Insertable items are again ultimately meaningless and may be the same as the above-mentioned deletable items.

Certain kinds of circuitry are intended to be multi-purpose. This is generally true, for example, for programmable logic devices ("PLDs"). It is generally desirable to design a PLD so that many different users can use it for a wide range of different uses. In this way, the PLD can be manufactured in large quantities, thereby lowering its unit cost. Certain ASIC architectures may also be designed so that with only limited customization they can support many different uses.

There are many different communication protocols that may require clock rate matching. For example, there are many different industry-standard protocols such as XAUI, Infiniband, Gigabit Ethernet, Fiber Channel, and Serial Rapid I/O, to name just a few. In addition, many users want to design their own communication protocols, which may deviate to a greater or lesser degree from some industry-standard protocol, or which may be quite different from any industry-standard protocol.

Multi-purpose clock rate matching circuitry is therefore needed, especially for inclusion in circuitry that is otherwise intended to be multi-purpose, to support the different clock rate matching needs of many different users.

SUMMARY OF THE INVENTION

In accordance with certain aspects of the invention, clock rate matching circuitry includes dedicated control circuitry and other circuitry that is capable of taking the place of at least part of the dedicated control circuitry in the event that the dedicated circuitry is not set up to support a desired communication protocol. For example, the other circuitry may include programmable logic circuitry. Dedicated state machine circuitry in the dedicated control circuitry is typically the or a part of the latter circuitry that is replaced by use of the other circuitry when the dedicated state machine circuitry is not able to support a desired communication protocol. For example, if the other circuitry includes programmable logic circuitry, that circuitry may be programmed to provide alternative state machine circuitry that is used instead of the dedicated state machine circuitry to control at least some aspects of the operation of the clock rate matching circuitry.

The clock rate matching circuitry may be interface circuitry (or part of interface circuitry) for other circuitry (e.g., logic circuitry (especially programmable logic circuitry)). The clock rate matching circuitry is typically used to buffer data between two clock domains that may have slightly different frequencies. One of these clock domains may be the clock domain of a data source. The other clock domain may be the clock domain of a data destination (e.g., the above-mentioned logic circuitry).

Further features of the invention, its nature and various advantages will be more apparent from the accompanying drawings and the following detailed description of the preferred embodiments.

DETAILED DESCRIPTION

Figure 1:
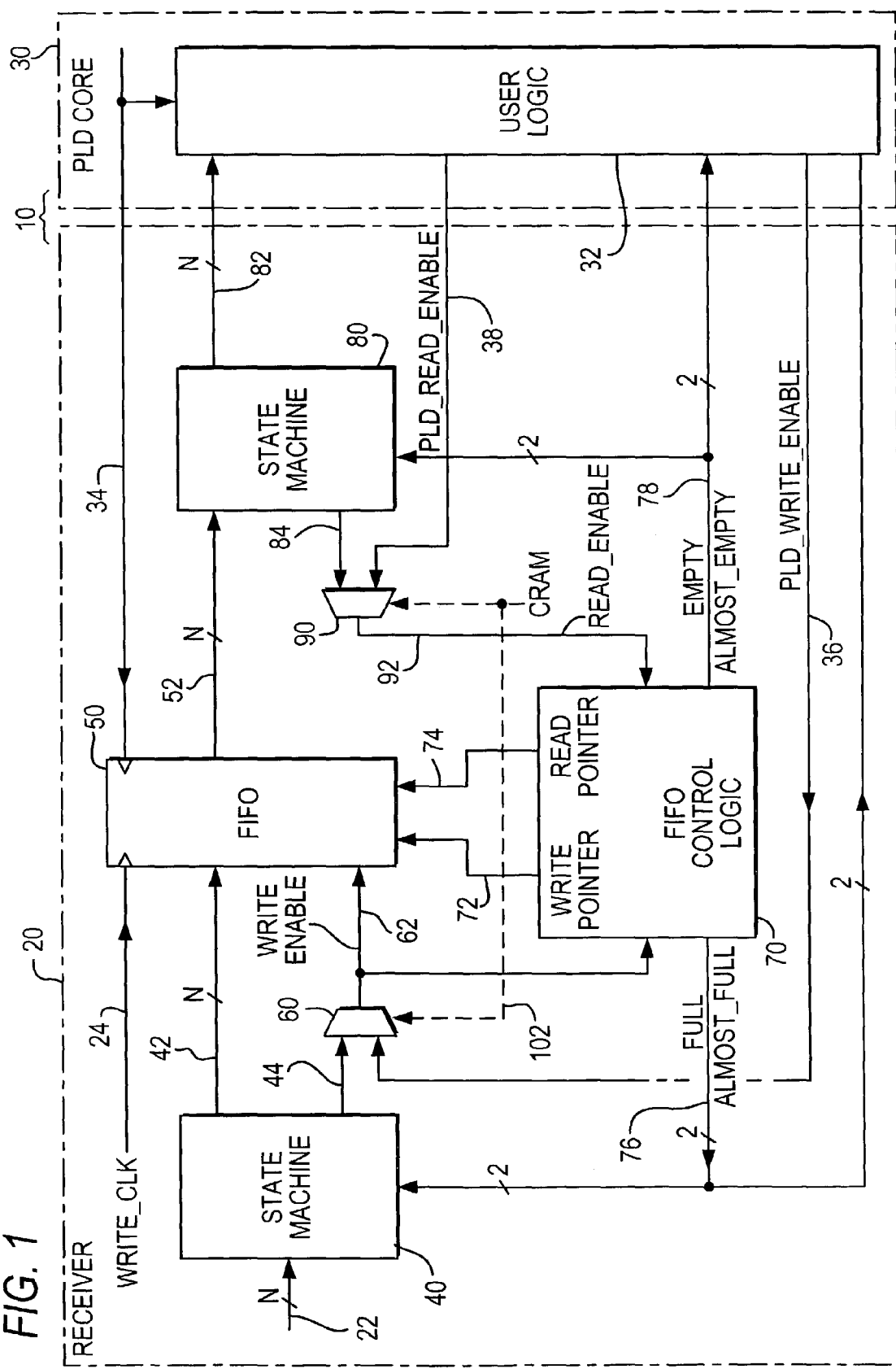
FIG. 1 is a simplified schematic block diagram showing an illustrative embodiment of the invention.

The illustrative embodiment shown in FIG. 1 is in the context of programmable logic device ("PLD") circuitry. Later in this specification it will be further explained that there are various possible alternatives to this type of embodiment. However, the invention will be fully understood from the following detailed description that refers, for the most part, to PLD embodiments like the one shown in FIG. 1.

The circuitry shown in FIG. 1 is all preferably part of one integrated circuit 10. However, other possible constructions are also possible, such as use of discrete circuit components, or having receiver circuitry 20 on one integrated circuit and PLD core circuitry 30 on another integrated circuit (both possibly in a multi-chip module 10). For convenience herein, all of circuitry 10 is sometimes referred to herein as PLD circuitry 10.

As has already been alluded to in the preceding paragraph, circuitry 10 includes receiver circuitry 20 and PLD core circuitry 30. A major portion of PLD core circuitry 30 is user logic circuitry 32, which is typically programmable to a large degree, although this programmability may be field programmability (possibly including reprogrammability), mask programmability, or any other type of programmability.

Receiver circuitry 20 may be all, substantially all, or only part of interface circuitry that is provided for helping circuitry 10 to receive data signals, typically for further processing by PLD core circuitry 30. In particular, circuitry 20 performs functions on incoming data to better prepare that data for application to PLD core circuitry 30. Additional information regarding circuitry like circuitry 10 (i.e., circuitry that includes receiver circuitry like circuitry 20 for preparing incoming data signals for application to other circuitry like PLD core circuitry 30) can be found in such references as Aung et al. U.S. patent application Ser. No. 09/805,843, filed Mar. 13, 2001, Lee et al. U.S. patent application Ser. No. 10/093,785, filed Mar. 6, 2002, Venkata et al. U.S. patent application Ser. No. 10/195,229, filed Jul. 11, 2002, Venkata et al. U.S. Pat. No. 7,180,972, and Venkata et al. U.S. Pat. No. 6,854,044. It is not believed that the material contained in these references is essential to understanding or practicing the present invention. But if for any reason more background or related information is desired, these references are a source of such information.

Circuitry 10, or more specifically circuitry 20, receives incoming data via leads 22 and a clock signal via lead 24. The data on leads 22 is preferably parallel data (e.g., bytes of N bits in parallel, the bytes being received one after another in synchronism with successive cycles of the clock signal on lead 24). These data and clock signals may have been applied to circuitry 10 in this form, or they may have been derived from signals applied to circuitry 10 in some other form. For example, the data and clock information may have been applied to circuitry 10 as a clock data recovery ("CDR") type signal combining both data and clock information in a single, high-speed, serial signal. In that case, receiver circuitry 20 would typically also include CDR circuitry for recovering from the input signal separate clock and data signals. In addition, receiver circuitry 20 would typically include deserializer circuitry for converting the recovered data from serial to parallel form, and divider circuitry for deriving a byte rate clock signal from the recovered (bit rate) clock. The resulting parallel-form data can be the data on leads 22 and the byte rate clock can be the clock signal on lead 24. Alternatively or in addition, various other types of processing can be performed on the incoming data, either by receiver circuitry 20 alone, or by the receiver circuitry with the help of PLD core circuitry 20. The references mentioned above describe many such other types of functions that can be performed on the incoming data if desired.

Whichever of the above-mentioned alternatives are employed, the net result that is significant for present purposes is that incoming data is supplied via leads 22 in synchronism with the clock signal on lead 24. The rate at which this data is supplied and therefore the frequency of the clock signal on lead 24 is determined by the ultimate source of the data, which is assumed to be some other circuitry, not shown in FIG. 1, that is operating more or less independently of the FIG. 1 circuitry. In particular, this source circuitry is assumed to have a source clock that is preferably closely matched in frequency, but not necessarily absolutely identical in frequency, to a clock of the FIG. 1 circuitry. The clock rate matching circuitry of this invention (e.g., as in FIG. 1) is provided to accommodate possible slight differences in frequency between the data source clock and the circuitry 10 clock.

The data signals on leads 22 are applied to write-side state machine circuitry 40. The clock signal on lead 24 is applied to the write clock input terminal of first-in/first-out ("FIFO") circuitry 50. The clock signal on lead 24 may alternatively or additionally be applied to other elements in FIG. 1, such as state machine 40, FIFO control logic 70, and PLD core 30 (including user logic 32). (Use of write-side state machine 40 is optional, as will be more fully described later in this application. However, to simplify this initial discussion of FIG. 1, it will be assumed that state machine 40 is used, and all references to alternative non-use of state machine 40 will be deferred until later.)

With respect to the applied data, one function performed by state machine 40 is to look for deletable bytes. As was mentioned earlier, a deletable byte is a byte that is ultimately meaningless to the real flow of information. A deletable byte is typically a byte with a special pattern of bits, and may therefore sometimes be referred to as a special character. Deletable bytes are included in the data stream at the source. They may be included randomly, at regular intervals, or in any other desired way, but they are preferably included frequently enough and in sufficient quantity to facilitate buffering between two different clock domains (i.e., the source clock domain and the circuitry 10 clock domain) as is being described herein. So to repeat, a task performed by state machine 40 with respect to the incoming data is to recognize when the incoming data is a deletable byte. State machine 40 passes the data on to the write port of FIFO 50 via leads 42. Other functions of state machine 40 are described later.

When enabled by a WRITE_ENABLE signal on lead 62, FIFO 50 writes (stores) the data on leads 42 in synchronism with the write clock signal on lead 24. The memory location in FIFO 50 at which the FIFO stores a byte of data is determined by FIFO control logic circuitry 70. In particular, circuitry 70 outputs write pointer signals on leads 72 to control the location (address) in FIFO 50 at which a data byte will be written. In general, the write pointer address increments (in recirculating ring-counter fashion) after each byte is written. However, that incrementing only takes place while the signal on lead 62 is a write enabling signal. In other words, if the WRITE_ENABLE signal on lead 62 is de-asserted (not asserted or not write enabling), control logic 70 does not increment the write pointer address until the signal on lead 62 again becomes write enabling. De-assertion of the WRITE_ENABLE signal on lead 62 also prevents further data from being written into FIFO 50. Any data that is received while WRITE_ENABLE is thus de-asserted is lost (deleted), but this does not matter as long as that data is deletable bytes. Operation of state machine 40 ensures that such data deletion is of deletable bytes, unless, of course, something is radically wrong with the data or with operation of the circuitry. These aspects of the operation of state machine 40 are further discussed below.

Turning now to the read side of FIFO 50, the FIFO receives a read clock signal from PLD core 30 via lead 34. The read clock signal may alternatively or additionally be applied to other elements in FIG. 1 such as state machine 80 and FIFO control circuitry 70. From circuitry 70 FIFO 50 receives read pointer (address) signals 74. FIFO 50 outputs via leads 52 the byte of data stored in its memory location that is currently identified by read pointer 74. This takes place in synchronism with read clock signal 34. Read pointer 74 operates like write pointer 72. In particular, the read pointer increments (in recirculating ring-counter fashion) after each read cycle as long as the READ_ENABLE signal is asserted on lead 92. Read pointer 74 does not increment while read enable 92 is not asserted, thereby causing the same data to be read again from FIFO 50. This has the effect of inserting another byte into the data stream, which is acceptable as long as the inserted information is an insertable byte as described earlier in this specification. One of the functions of read-side state machine 80 (described more extensively below) is to detect when an insertable byte has been read from FIFO 50 and can therefore be read again if necessary as part of a rate matching operation. In addition to monitoring data from FIFO 50 as just described, state machine 80 passes that data on to user logic 32 via leads 82. (As in the case of state machine 40, use of state machine 80 is optional, but all further discussion of that option will be deferred until later in this specification.)

From the foregoing (as well as from well-known operating principles of FIFO circuitry of this general kind) it will be apparent that write pointer 72 generally increments at the rate of write clock 24 and that read pointer 74 generally increments at the rate of read clock 34. Read pointer 74 should always be at least slightly behind write pointer 72, but it must not fall as much as a full lap behind the write pointer. A "lap" in this context is the total number of storage locations in FIFO 50. Use of the term "lap" comes from the fact that both the write pointer and the read pointer are cycling through the same range of address values on a repeating basis in recirculating ring-counter fashion, although they are doing so independently of one another based on the respective write (24) and read (34) clock frequencies, which may be slightly different from one another as has been mentioned.

Circuitry 70 monitors how close read pointer 74 is to write pointer 72, and also how close read pointer 74 is to being a full lap behind write pointer 72. If circuitry 70 detects that read pointer 74 is becoming very close to write pointer 72, it outputs an ALMOST_EMPTY signal on one of leads 78. This causes state machine 80 (assuming that it is being used) to use the opportunity of the next insertable byte in the data stream on leads 52 to cause READ_ENABLE signal 92 to be then disabled so that the insertable byte will be read again (and again, if necessary) until the ALMOST_EMPTY signal is no longer asserted. If the "almost empty" condition of FIFO 50 is not or cannot be relieved, and if read pointer 74 comes even closer to (or equal to) write pointer 72, circuitry 70 additionally or alternatively outputs an EMPTY signal on a second one of leads 78. Such an EMPTY signal may be interpreted by the circuitry receiving it as an indication that the data being output by receiver circuitry 20 may now be erroneous. This enables circuitry like user logic 32 to take action that is appropriate to the receipt of possibly erroneous data from receiver circuitry 20.

If circuitry 70 detects that read pointer 74 is becoming close to being a full lap behind write pointer 72, circuitry 70 outputs an ALMOST_FULL signal on one of leads 76. Such an ALMOST_FULL signal indicates that the buffering capacity of FIFO 50 has nearly all been used up because data is coming in to receiver 20 too fast as compared to the rate at which it is going out to PLD core 30. Receipt of an ALMOST_FULL signal by state machine 40 (assuming that it is being used) causes that circuitry (40) to use the opportunity of the next deletable byte in the data stream on leads 22/42 to cause WRITE_ENABLE signal 62 to be disabled. This stops the writing of data into FIFO 50 and also stops the incrementing of write pointer 72. Data writing and write pointer incrementing are resumed again when the ALMOST_FULL signal is no longer being asserted by circuitry 70. If the "almost full" condition of FIFO 50 is not or cannot be relieved, and if read pointer 74 becomes even closer to (or equal to) a full lap behind write pointer 72, circuitry 70 additionally or alternatively outputs a FULL signal on a second one of leads 76. A FULL signal may be interpreted by the circuitry that receives it as an indication that the data being output by receiver circuitry 20 may now be erroneous. As in the case of an EMPTY signal, this enables circuitry like user logic 32 to take action appropriate to the receipt of possibly erroneous data from receiver circuitry 20.

Returning again to state machine 40, it will now be apparent that (if used) this circuitry normally outputs a WRITE_ENABLE signal on lead 44. Programmable logic connector ("PLC") 60 is controlled by the signal on lead 102 to pass the signal on lead 44 to lead 62. If, however, state machine 40 is receiving an ALMOST_FULL signal from circuitry 70, state machine 40 responds to the deletable bytes in data 22 by de-asserting WRITE_ENABLE signal 44/62. This may continue until state machine 40 is no longer receiving an ALMOST_FULL signal, or until deletable bytes are no longer appearing in data 22, or in accordance with any other criteria that state machine 40 is set up to monitor or implement. For example, state machine 40 may be set up to continue to de-assert WRITE_ENABLE during several more deletable bytes (if any) that are received after ALMOST_FULL is de-asserted to gain some additional spacing from the "almost full" condition of FIFO 50. State machine 40 may perform other additional or alternative operations if it is alternatively or additionally receiving a FULL signal from circuitry 70.

State machine 80 (if used) may operate analogously to what has just been described for state machine 40. Thus state machine 80 normally outputs a READ_ENABLE signal via lead 84. PLC 90 is controlled by the signal on lead 102 to pass the signal on lead 84 to lead 92. If, however, state machine 80 is receiving an ALMOST_EMPTY signal from circuitry 70, it then responds to the detection of an insertable byte in data 52 by stopping the output of the signal needed to continue incrementation of read pointer 74. This causes the same (insertable) data to be read repeatedly from the same location in FIFO 50. State machine 80 may cause this to continue until ALMOST_EMPTY is no longer being asserted, until some maximum permissible number of repetitions of the insertable byte has been inserted (if there is such a limitation), and/or until any other criteria that circuitry 80 is set up to monitor and/or implement are satisfied. For example, even after ALMOST_EMPTY is de-asserted, state machine 80 may continue to cause a certain number of insertable bytes to be inserted to gain some additional space from the "almost empty" condition. State machine 80 may perform other additional or alternative operations if it is alternatively or additionally receiving an EMPTY signal from circuitry 70.

The circuit organization shown in FIG. 1 allows circuitry in PLD core 30 (typically in user logic circuitry 32) to be used in place of either or both of dedicated state machine circuits 40 and 80 in receiver circuitry 20. For example, in general- or multi-purpose circuitry 10 state machine circuits 40 and 80 may be constructed to perform the functions generally described for them above according to one or a few of the more common industry-standard communication protocols such as SONET and/or XAUI, etc. If a user wants to use device 10 for the protocol (or one of the protocols) that dedicated state machines 40 and 80 are constructed to support, the user can use circuits 40 and 80 to provide the necessary state machine functions. Even when circuits 40 and 80 are used, some aspects of their operations may be selectable (e.g., programmably selectable) by the user. For example, such selectability may apply to selecting one of several protocols that circuits 40 and 80 are constructed to support. As another example, such selectability may apply to selecting the values of certain parameters (such as byte length N) used in the operations that circuits 40 and 80 perform.

However, if a user wants to use device 10 for a communication protocol different from the protocol(s) supported by dedicated state machine circuits 40 and/or 80, the user can instead use part of user logic circuitry 32 to perform state machine functions for the remainder of the clock rate matching circuitry in receiver 20. This alternative will now be described in the next several paragraphs.

As shown in FIG. 1 and described thus far, all signals and/or information necessary for state machine operation are also available to user logic 32. Similarly, all control outputs of dedicated state machines 40 and 80 can be alternatively sourced from user logic 32.

Considering first the inputs to dedicated state machines 40 and 80, the data inputs to both of these circuits reach user logic 32 via leads 82. Similarly, the FULL, ALMOST_FULL, EMPTY, and ALMOST_EMPTY outputs 76/78 of circuitry 70 are all applied to dedicated state machines 40/80 and to user logic 32.

Turning now to the control outputs of dedicated state machines 40 and 80, the WRITE_ENABLE signal on lead 62 can be selected by PLC 60 to come from either dedicated state machine 40 output lead 44 or from user logic 32 via PLD_WRITE_ENABLE output lead 36. The selection made by PLC 60 is controlled by the signal on lead 102 (discussed in more detail below). Similarly, the READ_ENABLE signal on lead 92 can be selected by PLC 90 to come from either dedicated state machine 80 or from user logic 32 via PLD_READ_ENABLE output lead 38. Again, the selection made by PLC 90 is controlled by the signal on lead 102.

FIG. 1 shows both of PLCs 60 and 90 being controlled in the same way by a common signal 102. Such a signal may come from a programmable configuration RAM bit or cell ("CRAM") (e.g., in receiver 20 or PLD core 30) or from any other suitable source. This common control of PLCs 60 and 90 means that both of dedicated state machines 40 and 80 are either used or not used. As an alternative to this arrangement, each of PLCs 60 and 90 could have its own separate control (e.g., its own separate CRAM), thereby facilitating use of either one, but not both, of dedicated state machines 40 and 80.

Consideration will now be given to an illustrative user application in which dedicated state machines 40 and 80 are not used, and instead user logic 32 is used to perform state machine functions for the remainder of the clock rate matching circuitry in receiver 20. A portion of user logic 32 is programmed to perform write-side and read-side state machine functions consistent with whatever communication protocol the user desires to provide clock rate matching functionality for. That portion of user logic 32 is programmed to receive and monitor data from leads 82. That portion of user logic 32 is also programmed to receive and appropriately respond to the FULL, ALMOST_FULL, EMPTY, and ALMOST_EMPTY output signals 76/78 of circuitry 70. The relevant portion of user logic 32 is further programmed to appropriately condition its responses to signals 76/78 on the monitored condition of data 82 and any other conditions or criteria that the user selects. As at least part of its responses to these inputs, the relevant portion of user logic 32 outputs PLD_WRITE_ENABLE and PLD_READ_ENABLE signals 36/38 that are appropriate to these inputs and whatever other conditions or criteria this user logic circuitry is programmed to respond to and/or implement. PLCs 60 and 90 are controlled to cause FIFO 50 and control logic 70 to receive the PLD_WRITE_ENABLE signal 36 and the PLD_READ_ENABLE signal 38 (rather than the analogous output signals 44 and 84 of dedicated state machines 40 and 80). As a result, the clock rate matching circuitry in receiver 20 (primarily elements 50 and 70) receives its state machine control from user logic 32, rather than from dedicated state machines 40 and 80.

To eliminate any possible doubt, it is expressly noted here that even when dedicated state machines 40 and 80 are not being used to help control the remainder of the clock rate matching circuitry, they continue to pass data through from leads 22 to leads 42 and from leads 52 to leads 82.

Figure 2:
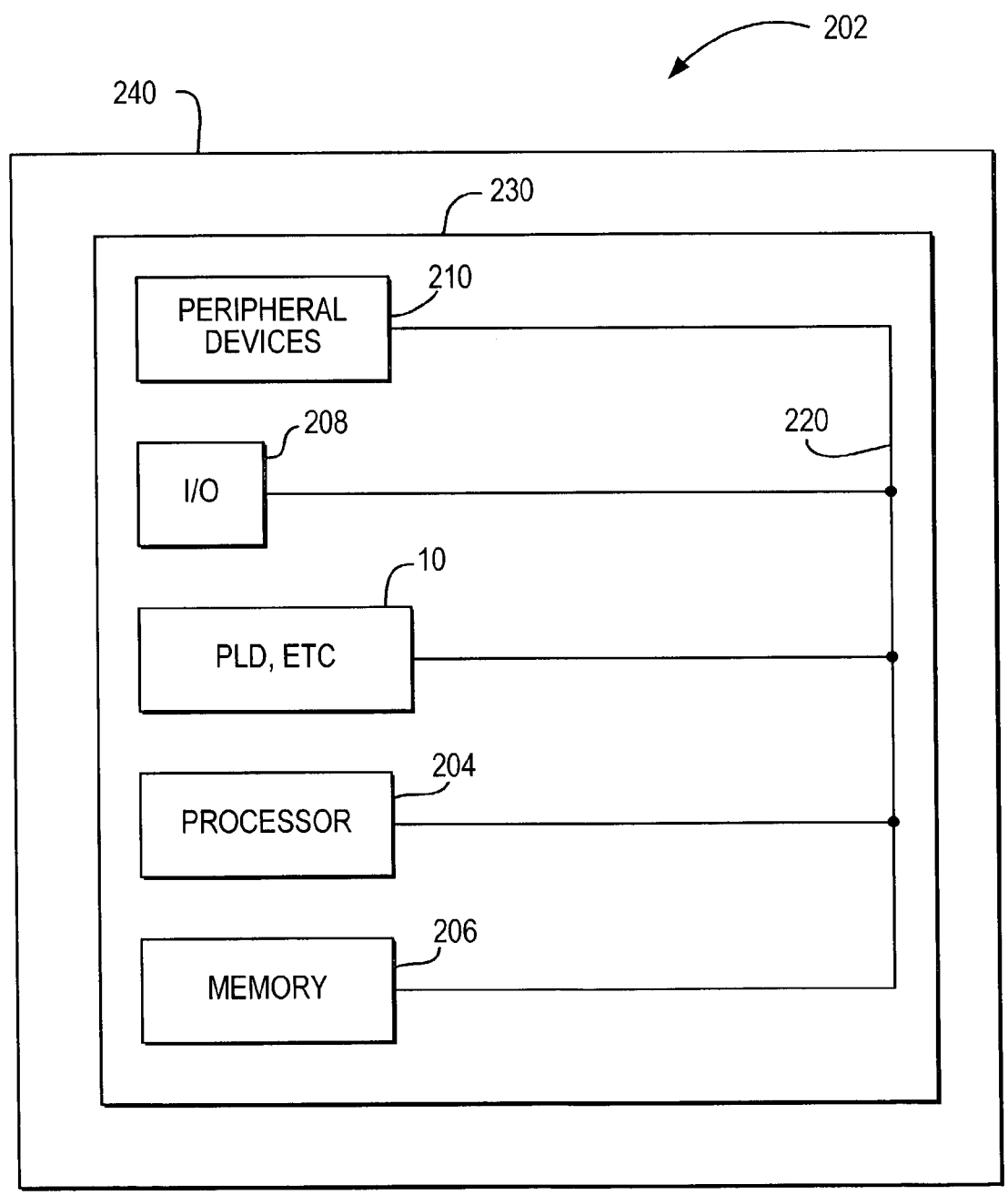
FIG. 2 is a simplified block diagram of an illustrative system employing circuitry in accordance with the invention.

FIG. 2 illustrates possible use of circuitry 10 of the type shown in FIG. 1 in a data processing system 202 in accordance with the invention. Data processing system 202 may include one or more of the following components: a processor 204, a memory 206, I/O circuitry 208, and peripheral devices 210. These components are coupled together by a system bus or other interconnections 220 and are populated on a circuit board 230 (e.g., a printed circuit board) that is contained in an end-user system 240. Communication among the various components shown in FIG. 2 and/or with external circuitry may be of the type described above in connection with FIG. 1 to any desired extent. As an addition or alternative to use of the circuitry 10 of this invention in a more or less stand-alone component 10 in FIG. 2, such circuitry may also or alternatively be provided as communication interface circuitry in any of the other components 204, 206, 208, and 210.

System 202 can be used in a wide variety of applications, such as computer networking, data networking, instrumentation, video processing, digital signal processing, or any other application where the advantage of using programmable or reprogrammable logic is desirable. Circuitry 10 (including programmable logic circuitry 30 as in FIG. 1) can be used to perform a variety of different logic functions. For example, circuitry 10 can be configured as a processor or controller that works in cooperation with processor 204. Circuitry 10 may also be used as an arbiter for arbitrating access to a shared resource in system 202. In yet another example, circuitry 10 can be configured as an interface between processor 204 and one of the other components of system 202. It should be noted that system 202 is only exemplary, and that the true scope and spirit of the invention should be indicated by the following claims.

Among the advantages of this invention are that circuitry 10 can be configured to support a very wide range of communication protocols. Some of these protocols can be built into the dedicated receiver circuitry 20 (especially in the dedicated state machines 40 and 80 in that circuitry). But any protocols that are not thus supported by dedicated circuitry can be implemented by using PLD core circuitry 30 to provide the necessary control. Even proprietary (custom) clock rate matching mechanisms can be implemented, while conserving resources, because FIFO elements like 50 and 70 are already hardwired (dedicated).

It will be understood that the foregoing is only illustrative of the principles of the invention, and that various modifications can be made by those skilled in the art without departing from the scope and spirit of the invention. For example, although separate dedicated write-side and read-side state machines 40 and 80 are shown in FIG. 1, those two state machine elements could be alternatively combined in a single dedicated state machine element. As another example of permissible modifications, receiver circuitry 20 may also include other elements for performing other functions on data passing through that circuitry. A number of such other possible elements and functions are shown and described in the several references mentioned earlier in this specification. Some of these other functions may be performed upstream of the clock rate matching circuitry shown in FIG. 1. Others of these functions may be performed downstream of the clock rate matching circuitry (e.g., between the clock rate matching circuitry and the PLD core circuitry 30 shown in FIG. 1).

The invention claimed is:

1. A programmable logic integrated circuit device capable of performing clock rate matching and comprising:
functional rate matching circuitry capable of providing data signals;
dedicated state machine circuitry capable of providing control signals to the functional rate matching circuitry and receiving data signals from the functional rate matching circuitry, the dedicated state machine circuitry having a built in protocol;
programmable logic core circuitry capable of being programmed to provide alternative state machine circuitry, wherein:
the alternative state machine circuitry is capable of providing control signals to the functional rate matching circuitry independently from the dedicated state machine circuitry, and
the programmable logic core circuitry is capable of receiving data signals from the functional rate matching circuitry via the dedicated state machine circuitry; and
selection circuitry for selecting either the dedicated state machine circuitry control signals or the alternative state machine circuitry control signals to control at least some aspect of operation of the functional rate matching circuitry.

2. The circuit device defined in claim 1 wherein the functional rate matching circuitry comprises First In First Out (FIFO) memory circuitry.

3. The circuit device defined in claim 2 wherein the functional rate matching circuitry further comprises First In First Out (FIFO) control circuitry.

4. The circuit device defined in claim 3 wherein the FIFO control circuitry provides write pointer signals and read pointer signals to the FIFO memory circuitry.

5. The circuit device defined in claim 3 wherein the FIFO control circuitry monitors the FIFO memory circuitry with respect to a degree of fullness and a degree of emptiness of the FIFO memory circuitry.

6. The circuit device defined in claim 5 wherein the FIFO control circuitry provides fullness-indicating and emptiness-indicating control signals to the dedicated state machine circuitry and to the programmable logic core circuitry.

7. The circuit device defined in claim 1 wherein the aspect of the operation includes enablement of writing data into the functional rate matching circuitry.

8. The circuit device defined in claim 1 wherein the aspect of the operation includes reading data out of the functional rate matching circuitry.

9. The circuit device defined in claim 1 further comprising circuitry for supplying outputs of the functional rate matching circuitry to the programmable logic core circuitry.

10. The circuit device defined in claim 1 wherein the selection circuitry is programmably controlled.

11. A digital processing system comprising:
processing circuitry;
a memory coupled to the processing circuitry; and
a programmable logic integrated circuit device as defined in claim 1 coupled to the processing circuitry and the memory.

12. A printed circuit board on which is mounted a programmable logic integrated circuit device as defined in claim 1.

13. The printed circuit board defined in claim 12 further comprising:
a memory mounted on the printed circuit board and coupled to the programmable logic integrated circuit device.

14. The printed circuit board defined in claim 12 further comprising:
processing circuitry mounted on the printed circuit board and coupled to the programmable logic integrated circuit device.

15. A programmable logic integrated circuit device capable of buffering data between first and second clock domains and comprising:
memory circuitry normally storing successive data items in synchronism with the first clock domain and normally outputting the oldest, previously unread data item stored in the memory circuitry in synchronism with the second clock domain, the memory circuitry being capable of providing data signals;
dedicated state machine circuitry having a built in protocol and being capable of receiving data signals from the memory circuitry, the dedicated state machine circuitry comprising:
a first state machine capable of providing a first control signal to said memory circuitry; and
a second state machine capable of providing a second control signal different from said first control signal to said memory circuitry;
programmable logic core circuitry capable of being programmed to provide alternative state machine circuitry, wherein the alternative state machine circuitry is capable of providing alternative first and second control signals that can take the place of said first and second control signals to said memory circuitry, and wherein the programmable logic core circuitry is capable of receiving data signals from the memory circuitry via the dedicated state machine circuitry; and
selection circuitry comprising:
a first selector for selecting either the first control signal or the alternative first control signal to control at least one of data storing enablement and data outputting enablement of the memory circuitry; and
a second selector for selecting either the second control signal or the alternative second control signal to control at least one of data storing enablement and data outputting enablement of the memory circuitry.

16. The circuit device defined in claim 15 wherein the selection circuitry is programmable to select either the dedicated state machine circuitry or the alternative state machine circuitry.

17. The circuit device defined in claim 15 wherein the memory circuitry further comprises control circuitry operable to provide outputs substantially indicative of the fullness and emptiness of the memory circuitry, and wherein those outputs are applied to the dedicated state machine circuitry and the programmable logic core circuitry.

18. The circuit device defined in claim 15 further comprising connections that apply the data output by the memory circuitry to the programmable logic core circuitry.

* * * * *